United States Patent [19]

Noble

[11] Patent Number: 5,388,550
[45] Date of Patent: Feb. 14, 1995

[54] SANITARY FACILITY FOR ANIMALS

[76] Inventor: Shannon R. Noble, 513 15th St., NE., Canton, Ohio 44714

[21] Appl. No.: 71,975

[22] Filed: Jun. 7, 1993

[51] Int. Cl.$^6$ ............................................. A01K 1/035
[52] U.S. Cl. .................................................... 119/165
[58] Field of Search ................ 119/165, 166, 168, 170

[56] References Cited

U.S. PATENT DOCUMENTS

| | | | |
|---|---|---|---|
| 2,932,279 | 4/1960 | Giles | 119/15 |
| 3,085,550 | 4/1963 | Crawford | 119/1 |
| 3,227,137 | 1/1966 | Goldman et al. | 119/1 |
| 3,233,588 | 2/1966 | Thomas | 119/1 |
| 3,246,630 | 4/1966 | Dearing et al. | 119/165 |
| 3,428,026 | 2/1969 | Sohmers et al. | 119/19 |
| 3,796,188 | 3/1974 | Bradstreet | 119/1 |
| 3,822,671 | 7/1974 | Rosenberg | 119/1 |
| 3,885,523 | 5/1975 | Coleman | 119/165 |
| 4,732,111 | 3/1988 | Runion | 119/1 |
| 5,042,430 | 8/1991 | Casmira | 119/165 |
| 5,092,277 | 3/1992 | Baillie et al. | 119/165 |
| 5,165,366 | 11/1992 | Harvey | 119/165 |
| 5,195,464 | 3/1993 | Mutter | 119/165 |
| 5,218,930 | 6/1993 | Casmira | 119/165 |
| 5,220,886 | 6/1993 | Hyde | 119/165 |

*Primary Examiner*—Robert P. Swiatek
*Attorney, Agent, or Firm*—Michael Sand Co.

[57] ABSTRACT

An apron adapted to be fitted to an existing sanitary facility for animals having a pan containing litter and a cover. The apron includes a shallow tray which is divided into first and second compartments wherein the first compartment has a top wall formed with an opening for receivably mounting the pan therein. A plurality of serrations are formed in the top wall to provide a number of breakaway portions to form various size pan receiving openings. The second compartment extends in front of an access opening formed in the pan cover and a screen is mounted over an open top of the compartment. As the animal exits the pan through the cover opening it passes over the screen, whereby debris trapped in the animals paws will be dislodged and will and pass through the screen and into the second compartment. A vanity panel extends in front of the access opening, on the opposite side of the screen from the cover opening to prevent the animal from jumping over the screen without first walking over the screen.

12 Claims, 2 Drawing Sheets

SANITARY FACILITY FOR ANIMALS

BACKGROUND OF THE INVENTION

1. Technical Field

The invention relates generally to an improved sanitary facility for animals. More particularly, the invention relates to a sanitary facility apron particularly adapted to remove debris from an animal's paws when the animal exits the sanitary facility. Specifically, the invention relates to an improved sanitary facility apron which may be used with covered sanitary facilities having a variety of sizes, and which will remove debris from the animal's paws.

2. Background Information

It is customary to provide toilet facilities for indoor animals, and specifically cats, in houses and apartment buildings as a means for housebreaking cats in situations when the cat will either have to or would prefer to depend on indoor facilities. Cats can easily be trained to use indoor sanitary facilities especially when the facility utilizes some form of absorbent material, such as litter or sand. This ease arises from the cat's instinct to conceal its excretions. If given the opportunity, a cat will always attempt to cover their excrement, usually by scratching and clawing at the surrounding material. In an indoor sanitary facility filled with litter, the cat will thus claw and scratch at the litter in the facility to cover the excrement.

Such sanitary facilities are well known and have been the subject of a number of United States letters patents including U.S. Pat. Nos. 3,233,588 and 3,796,188.

While these prior art devices are presumably sufficient to achieve the purpose for which they were intended, one problem inherent in this type of sanitary facility is that while the cat is scratching, debris is thrown out of the facility and onto the surrounding floor area. Such problem has been solved by adding a cover to the top of the facility with a small ingress and egress opening for the animal. A variety of such prior art devices are shown specifically in U.S. Pat. Nos. 3,085,550, 3,246,630, 3,822,671, 4,732,111, and 5,092,277.

However, a second problem is also associated with this type of sanitary facility, in that, after the cat has finished scratching, it will exit the sanitary facility and track the material over the surrounding floor area absent provisions for dislodging the litter material from the cat's paws and retaining the removed litter in a closed area. A number of devices have been developed which are presumably adequate to achieve the purpose for which they were intended, but which have presented problems in the art.

U.S. Pat. No. 3,246,630 provides a screen area over which the cat must walk to dislodge the debris from the cats paws. However, the screen area significantly reduces the litter holding area of the facility. Moreover, the facility itself incorporates the screen inside the cover. Therefore, the screen is awkward to retrieve for cleaning, and cannot be retrofitted to existing facilities. An owner of an existing facility must replace the entire facility to benefit from the screen, which increases expense.

U.S. Pat. No. 3,885,523 also provides a screen over which the animal is forced to walk in order to remove litter from the animal's paws. Like the '630 patent, the screen is carried inside the existing facility which presents the very problems associated with the '630 patent in that an existing facility must be replaced to utilize the device of the '513 patent. Moreover, litter will extend under the screen area where it will be unusable by the animal, and is thus wasted.

U.S. Pat. No. 5,092,277 also provides a screen over which the animal must walk when exiting the litter pan. However, the screens are offset above the litter area which results in a structure much more complicated, and much larger than an average sanitary facility.

Therefore, the need exists for a sanitary facility apron which will provide a screen in the path of an animal exiting from a usual sanitary facility to remove the debris from the animal's paws; in which the apron is adaptable for use with sanitary facilities of a variety of sizes; and in which the facility may be secured to the apron, and removed therefrom for cleaning.

SUMMARY OF THE INVENTION

Objectives of the invention include providing an improved sanitary facility apron for removing debris from an animal's paws after the animal exits a covered sanitary facility.

A further objective includes providing such a sanitary facility apron which may be retrofitted to an existing sanitary facility.

Another objective is to provide such an apron which may be adapted for use with sanitary facilities of a variety of sizes.

Yet another objective is to provide such an apron which removes debris from an animal's paws after the animal has exited the sanitary facility.

Still another objective of the present invention is to provide an apron which may easily be installed on a variety of sanitary facility sizes, and repeatedly removed from the facility to afford the owner the opportunity to clean the apron.

A still further objective is to provide such an apron wherein a tray is provided having one compartment for retaining debris removed from the animal's paws, and a second compartment with may be adapted to accept the pan of a usual covered sanitary facility.

A still further objective is to provide such an apron which is of simple construction, which achieves the stated objectives in a simple, effective and inexpensive manner, and which solves problems and satisfies needs existing in the art.

These and other objectives and advantages of the invention are obtained by the sanitary facility apron for removing debris from the animal's paws, and which may be adapted to be retrofitted to a variety of sizes of existing sanitary facilities, the general nature of which may be stated as including a relatively shallow tray; a vertical partition dividing said tray into a first compartment adapted for retaining the debris removed from the animal's paws, and a second compartment adapted to accept the covered sanitary container; and debris removing means for removing debris from the animal's paws extending over said first compartment.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
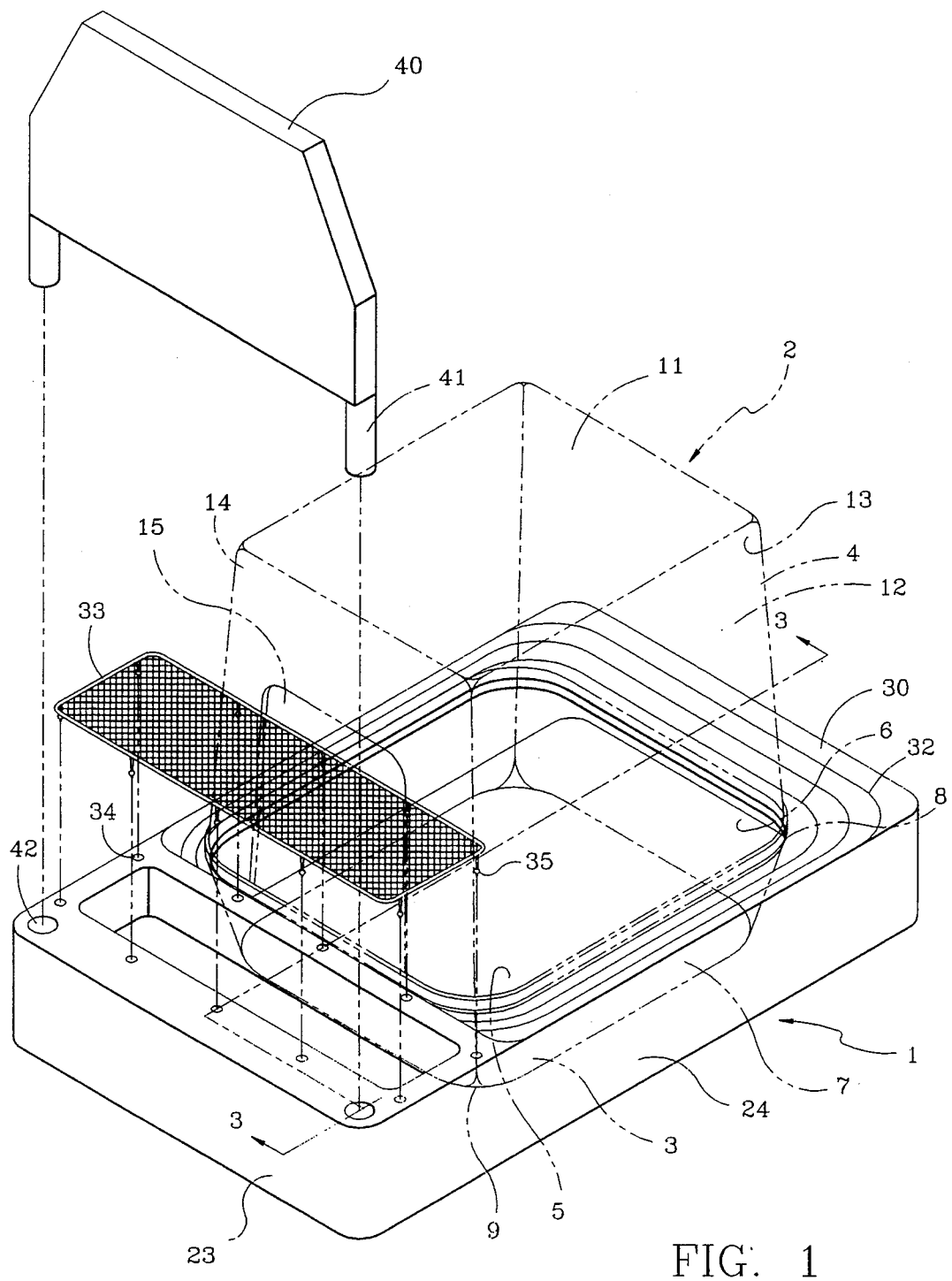
FIG. 1 is an exploded perspective view of the sanitary facility apron, shown in combination with a covered sanitary facility for animals shown in dot-dash lines.

A sanitary facility apron according to the present invention is designated generally at 1, and is shown particularly in FIG. 1 in cooperation with a sanitary facility 2. Sanitary facility 2 is known, and is of the type having a pan 3 and cover 4. Pan 3 is relatively shallow, and is formed of a bottom wall 5, with spaced apart end walls 6, and spaced apart side walls 7 which are generally perpendicular to end walls 6 and extend upwardly from the edges of bottom wall 5. A lip 8 extends outwardly from the free ends of walls 6 and 7. End walls 6 and side walls 7 meet generally at radiused corners 9.

Cover 4 is also known, and is formed with a top wall 11, spaced apart side walls 12 and spaced apart end walls 13 and 14. End wall 14 is formed with an opening 15 through which the animal enters and exits the covered sanitary facility. The free ends of walls 12, 13 and 14 are sized to engage lip 8 of pan 3 and are dimensioned to be of the same length and width, respectively, as the inner surface of lip 8 in order to provide a removable interconnection between pan 3 and cover 4.

Figure 2:
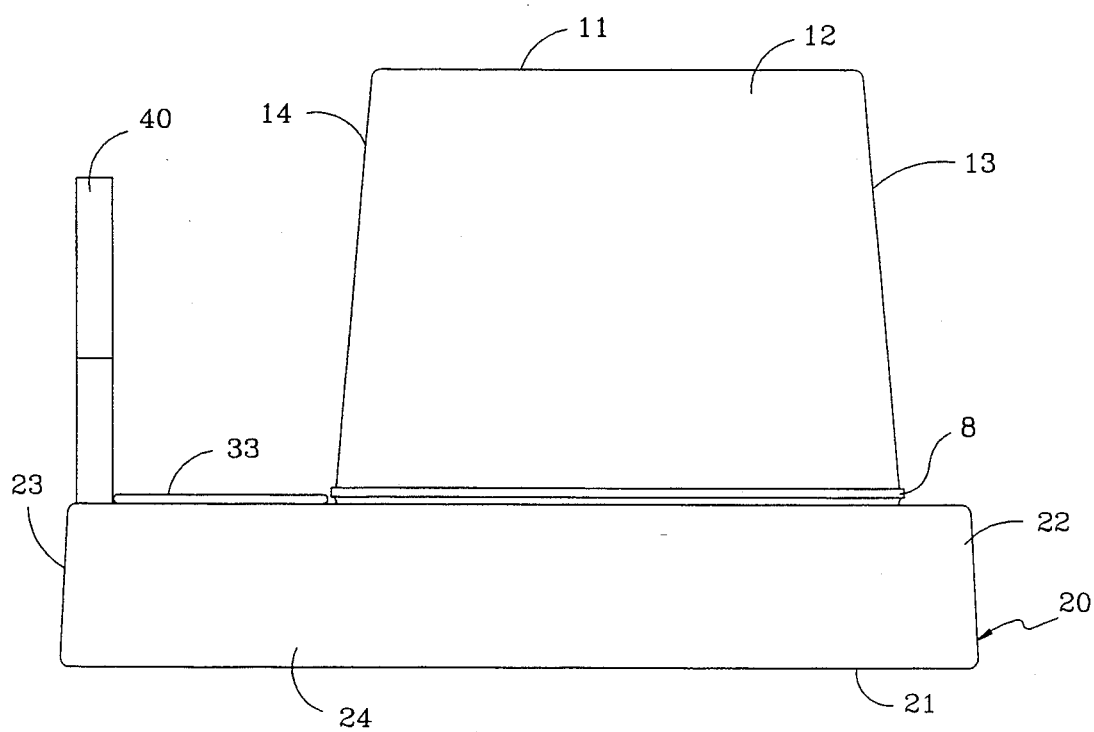
FIG. 2 is a side elevational view of the present invention shown in combination with a covered sanitary facility.

In accordance with one of the main features of the present invention, a relatively shallow tray indicated generally at 20, is provided for removably holding pan 3 and cover 4. Tray 20 includes a bottom wall 21 (FIG. 2), spaced apart end walls 22 and 23, and spaced apart side walls 24 which extend upwardly from the perimeter of bottom wall 21. Inasmuch as side walls 24 and end walls 22 and 23 are orthogonally related and integrally formed with bottom wall 21, walls 21–24 form a shallow tray. A vertical partition 25 (FIG. 3) extends upwardly from bottom wall 21 and extends between sidewalls 24, parallel to end walls 22 and 23. Partition 25 thus divides tray 20 into a first compartment 26 and a second, smaller compartment 27.

Figure 3:
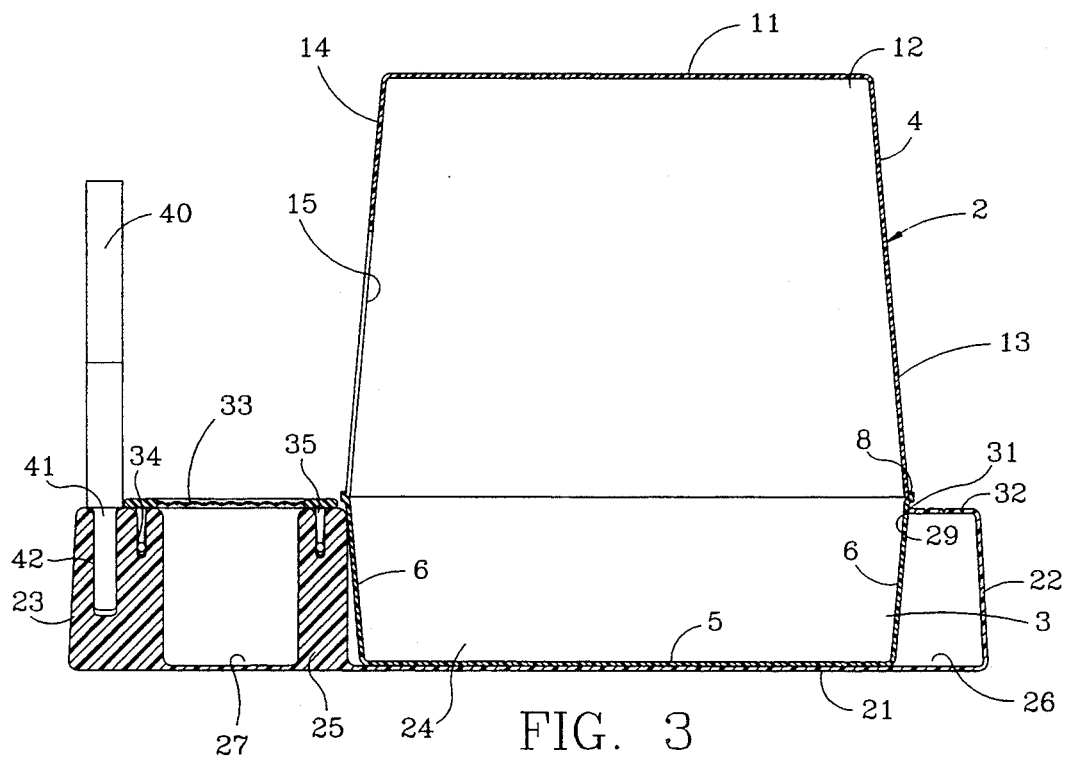
FIG. 3 is a sectional view of the present invention, taken along line 3—3 in FIG. 1 with the covered sanitary facility shown in combination therewith.

In further accordance with one of the main features of the present invention, a top wall 30 extends over a portion of first compartment 26 having its perimeter edges integrally molded with the free ends of end wall 22, side walls 24, and partition 25 (FIGS. 1 and 3). An aperture 31 extends through the center of top wall 30 and is defined by a peripheral edge 29. A number of radially spaced serrations 32 are formed in top wall 30 and extend around a portion of aperture 31, the purpose for which will become more apparent hereinbelow. Serrations 32 extend around only three sides of aperture 31 in the preferred embodiment, but could extend around the entire aperture without departing from the spirit of the present invention. Preferably, serrations 32 define apertures which correspond to various size sanitary facilities.

End wall 23, a portion of side walls 24, and partition 25 define second compartment 27. In accordance with another of the main features of the present invention, a screen or mesh member 33 extends over compartment 27, in front of access opening 15 of sanitary facility 2. Screen member 33 may be permanently mounted over compartment 27 by any convenient attachment means, but is preferably removably mounted over compartment 27. In the preferred embodiment, a number of equally spaced blind holes 34 are formed in end wall 23, side walls 24, and partition 25, which are of sufficient thickness to provide for such holes 34. Complementarily shaped studs 35 extend downwardly from screen 33, and are adapted to extend into holes 34 in a snap-fit relationship for installing screen 33 over compartment 27. In this manner, screen 33 is releasably held in position in front of access opening 15, but may be removed easily for cleaning.

While screen 33 extends in front of the entire width of access opening 15, occasionally the animal utilizing the sanitary facility will refrain from walking over the screen, and will jump over the screen and onto the surrounding floor. In such a situation, a vanity panel 40 may be positioned in front of the access opening 15, co-planer with end wall 23. Specifically, a pair of posts 41 extend downwardly from panel 40, and extend into complementarily shaped blind holes 42 formed into end wall 23 to removably mount panel 40 in front of opening 15.

Turning to the installation and operation of sanitary facility apron 1 (FIGS. 1 and 2), top wall 30 is provided with an aperture 31 as described in detail above. Aperture 31 is sized to accept a small sanitary facility consisting of pan 3 and cover 4. If the pan of the customer's chosen sanitary facility is larger than aperture 31, the customer locates the serration 32 which most closely approximates the size of the pan of the facility 2, and breaks away that portion of top wall 30 which is on the interior of that serration. In this manner, an aperture 31 is formed which is large enough to accept the particular size of chosen sanitary facility. Moreover, the above operation provides for the retro-fitting of the apron to existing sanitary facilities thereby reducing waste, and expense to the end user. Inasmuch as apron 1 is formed of breakable material, the breaking way of the plastic at the appropriate serration 32 would not be difficult, but may be aided by using a knife.

In any event, the variety of serrations 32 are sized to correspond to the dimensions of commonly sold sanitary facilities 2, and the invention may be purchased with such a facility, or later be retrofitted to an existing facility 2. Serrations 32 are merely areas of reduced material thickness or V-shaped grooves formed in the material of top wall 30. In this manner, the plastic may be broken at the apex of the V-shaped groove, with a remaining portion of the groove guiding the sanitary facility 2 into position.

After facility 2 has been fitted into aperture 31, screen 33 is positioned over compartment 27 via the placement of studs 35 into holes 34. Lastly, vanity plate 40 will be placed in front of access opening 15 via the insertion of posts 41 into holes 42.

During use, the animal will enter the sanitary facility by walking over screen 33. When the animal is completed in sanitary facility 2, it will exit through opening 15. When exiting facility 2, the animal must walk over the screen which will remove most of the debris or litter from the animals paws. The removed debris passes through the screen and is collected in compartment 27. Occasionally, the compartment may be cleaned by removing screen 33, providing easy access to compartment 27. Vanity panel 40 will prevent the animal from jumping over screen 33 as it exits opening 15, and will require the animal to turn while standing on screen 33, assisting in removing debris from the animals paws.

In the preferred embodiment, the sanitary facility apron of the present invention is made of plastic, but could be made of cardboard, wood, etc. without departing from the spirit of the present invention.

Accordingly, the sanitary facility apron is simplified, provides an effective, safe, inexpensive, and efficient device which achieves all the enumerated objectives, provides for eliminating difficulties encountered with prior devices, and solves problems and obtains new results in the art.

In the foregoing description, certain terms have been chosen for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved sanitary facility apron is constructed and used, the characteristics of the construction, and the advantageous, new and useful results obtained; the new and useful structures, devices, elements, arrangements, parts and combinations, are set forth in the appended claims.

I claim:

1. In combination, a sanitary facility of the type having a pan, a pan cover, an ingress and egress opening formed in said pan cover, and apron means for removably holding the pan and cover, and for removing debris from an animal's paws as said animal leaves the pan through said opening; said apron means comprising:
   a tray;
   a partition dividing said tray into a first compartment adapted for retaining the debris removed from the animal's paws, and a second compartment adapted to accept the pan and cover; and
   debris removing means extending over said first compartment for removing debris from the animal's paws.

2. The combination as defined in claim 1 further comprising holding means for holding the pan and cover in the tray, said means being adjustable to accept a variety of sizes of pans and covers.

3. The combination as defined in claim 2 wherein said holding means further comprises a top wall extending over the second compartment, said top wall having at least one serration radially spaced from a center of said top wall and extending around at least a portion thereof; and in which said at least one serration provides an area of reduced material thickness, such that a portion of said top wall may be broken away to form an opening in the top wall for accepting a particular size of pan.

4. A combination as defined in claim 1 wherein the debris removing means comprises a screen extending over the first compartment in front of the opening formed in the pan cover.

5. A combination as defined in claim 1 wherein the tray further comprises spaced apart end walls, and spaced apart sidewalls substantially orthogonal to said end walls; and in which the screen snap-fittedly engages at least one of one end wall, the partition, and the sidewalls of the first compartment.

6. A combination as defined in claim 1 wherein blocking means extends upwardly from an end of the apron means for blocking an animals direct path from the sanitary facility.

7. A combination as defined in claim 6 wherein said blocking means is a shield extending upwardly from the apron means in front of the cover opening; and in which the debris removing means is located between the opening and the shield.

8. A sanitary facility apron adapted for use with a covered sanitary facility for animals, for removing debris from an animal's paws, comprising:
   a relatively shallow tray;
   a partition positionable outside of said covered sanitary facility dividing said tray into a first compartment adapted for retaining debris removed from an animal's paws, and a second compartment adapted to accept the covered sanitary facility;
   debris removing means positionable outside of said covered sanitary facility and extending over said first compartment for removing debris from an animal's paws as said animal walks across said debris removing means; and
   retaining means for retaining said sanitary facility within the tray; and in which said retaining means are adjustable to accept a variety of sizes of sanitary facilities.

9. The sanitary facility apron as defined in claim 8 wherein said retaining means further comprises a top wall extending over the second compartment adapted to accept the sanitary facility; and in which said top wall has at least one serration, radially spaced from a center of said top wall, and extending around at least a portion thereof; and in which said at least one serration provides an area of reduced material thickness, such that a portion of said top wall may be broken away to accept a varying size sanitary facilities.

10. A sanitary facility apron adapted for use with a covered sanitary facility for animals, for removing debris from an animal's paws, comprising:
    a relatively shallow tray;
    a partition positionable outside of said covered sanitary facility dividing said tray into a first compartment adapted for retaining debris removed from an animal's paws, and a second compartment adapted to accept the covered sanitary facility;
    debris removing means positionable outside of said covered sanitary facility add extending over said first compartment for removing debris from an animal's paws as said animal walks across said debris removing means; and
    animal blocking means extending upwardly from an end of the tray for blocking the animal's direct path from said sanitary facility.

11. A sanitary facility apron as defined in claim 10 wherein the animal blocking means is a vanity shield extending upwardly from the tray for placement in front of an ingress opening formed in the sanitary facility; and in which the debris removing means is located between said shield and the ingress opening.

12. A sanitary facility apron adapted for use with a covered sanitary facility comprising a pan and a cover for animals, for removing debris from an animal's paws, comprising:
    a substantially rectangular relatively shallow tray;

a partition adapted to be positioned outside of the covered sanitary facility dividing said tray into a first compartment adapted for retaining debris removed from an animal's paws, and a second compartment adapted to accept the pan of the sanitary facility;

a screen extending over the first compartment and in which the screen is adapted to extend in front of an access opening formed in a sanitary facility, and in which the screen member is a rectangular member having its longer side extending fully across a shorter dimension of the rectangular tray member; and mounting means for releasably mounting the screen over the first compartment including a plurality of studs which form a snap-fit engagement with a plurality of blind holes formed in at least one of the partition, one end wall, and the sidewalls.

* * * * *